United States Patent

Bridges

[19]

[11] Patent Number: 5,826,540
[45] Date of Patent: Oct. 27, 1998

[54] SQUIRREL RESISTANT BIRD FEEDER

[76] Inventor: Thomas L. Bridges, 46 Cottekill Rd., Cottekill, N.Y. 12419

[21] Appl. No.: 905,383

[22] Filed: Aug. 4, 1997

[51] Int. Cl.$^6$ .................................................. A01K 5/00
[52] U.S. Cl. ............................................................ 119/52.3
[58] Field of Search ................................ 119/52.1–52.4, 119/57.8, 57.9

[56] References Cited

U.S. PATENT DOCUMENTS

| | | | |
|---|---|---|---|
| 3,145,690 | 8/1964 | Bachman | 119/52.3 |
| 4,541,362 | 9/1985 | Dehls | 119/57.9 |
| 5,163,382 | 11/1992 | Morrison | 119/57.9 |
| 5,375,558 | 12/1994 | Drakos | 119/57.9 |
| 5,445,109 | 8/1995 | Gray et al. | 119/57.9 |
| 5,568,789 | 10/1996 | Koenig et al. | 119/57.9 |

*Primary Examiner*—Thomas Price
*Attorney, Agent, or Firm*—Joseph B. Taphorn

[57] ABSTRACT

A squirrel-resistant bird feeder includes an inner seed-containing cylinder having a central upwardly-extending rod for mounting on a support and side openings for providing bird access to the seed. A hollow cylinder having a top surface with a central opening from about which a central hollow baffle depends controls seed levels while passing seed to lower dispensers. A relatively-movable outer cylinder guards the inner seed-containing cylinder and has side openings which align with the inner cylinder side openings when in its normal or home position to which it is urged by a tension spring. A squirrel alighting on the bird feeder moves the outer cylinder relative to the inner one against the tension of a spring to where their side openings are non-aligned to preclude squirrel access to the inner cylinder seed. A pin and slot arrangement insures opening aligment in the home position. The outer cylinder is formed of gnaw resistant materials. A small hole in an outer cylinder end cap passes the rod to limit swinging action of the bird feeder and help guide relative movement between the cylinders. Aligned magnets on the inner and outer cylinders help hold the outer cylinder in the normal or home position.

22 Claims, 2 Drawing Sheets

5,826,540

SQUIRREL RESISTANT BIRD FEEDER

INTRODUCTION

0. Invention Disclosure Document

Applicant claims priority based on the filing of Invention Disclosure Document No. on 1997 in the United States Patent and Trademark Office.

1. Field of the Invention

This invention relates to squirrel resistant bird feeders, and more particularly, to a squirrel resistant bird feeder utilizing the weight of a squirrel to close off access to the bird feed.

2. Background of the Invention

Squirrels are notorious for helping themselves to the seed contents of bird feeders. They not only voraciously devour freely available seed, but will both operate the feeder as by tilting or swinging or destroy it as by tearing or gnawing the materials apart to make the seed available.

3. Prior Art

Efforts to preclude squirrel and other animal access to bird feeders have included U.S. Pat. Nos. to Dilley (3,086,499); Curtis et al (3,164,130); Prowinsky (3,301,217); Perkins et al (4,434,745); Vandiver (4,867,104); and Meng (5,323,735). Dilley employs several techniques. As a first technique, he mounts the bird feeder atop a metal pole having a smooth surface to preclude the squirrel from shinnying up it to the feeder. Then he employs a platform which extends radially outward for a considerable distance from the pole to place the edge of it beyond the reach of the squirrel. He further employs spring loaded fins or vanes which fold under the weight of the squirrel which prevent the squirrel from getting a firm grip thereon. He also relies on the low friction of a swivel bearing supporting the feeder on the pole to allow the feeder to turn from the reactive force resulting from movements of the animal to provide unreliable footing to discourage the animal.

Curtis et al limit access by larger unwanted species of birds by biasing a hindgedly-mounted bird-supporting plate in a feeding position for small birds. When unwanted larger birds land on the plate, it moves down against the bias to disconcert if not alarm the bird to cause him to abandon his purpose and depart the scene. Curtis et al also prevent the bird's feeding by the obstructive action of a top plate swinging down with the supporting plate to effectively close off access to the feed.

Prowinsky prevents feed from being pirated by undesired intruders by employing on all sides of a shallow dish, wire mesh panels having openings selected in size to encourage use of the feeder by desired birds while excluding larger birds.

Perkins provides a bird feeding device which can be accessed by birds and not by squirrels by enclosing a cylindrical plexiglass container holding feed and having one or more openings therein through which birds may access the food contained therein, inside a wire mesh from which it is evenly spaced. The container is spaced from the mesh a sufficient distance to prevent squirrels from chewing the container to enlarge the openings to access the seeds therein.

Vandiver employs a squirrel guard to prevent squirrels from reaching the bird seed held by the feeder. The squirrel guard is mounted on the base of the feeder and includes roller elements which extend completely around its perimeter. The roller elements are positioned so that they must be gripped by the animals, and the elements then rotate to prevent a grip secure enough to allow the animal to climb past the squirrel guard onto the feeder.

Meng places gnaw-resistant bars which are spaced apart a particular distance, in front of the bird seed to limit gray squirrel access to the seed.

Unfortunately, no commercial product is on the market which successfully solves the problem of gray as well as other squirrels.

SUMMARY OF THE INVENTION

Accordingly, is is an object of the invention to provide a commercially-successful squirrel-resistant bird feeder.

A more particular object of the invention is to provide a bird feeder which successfully resists the attention of squirrels.

Yet another object of the invention is to provide a bird feeder wherein the seeds can not be had by squirrels.

A further object of the invention is to provide a bird feeder which is resistant to destruction by squirrels.

A still further object of the invention is to provide a bird feeder which is reliable in operation and easy to fill.

A yet further object of the invention is to provide a bird feeder which is inexpensive of and simple to manufacture.

A yet another object of the invention is to provide a bird feeder which is attractive in appearance.

The objects of the invention are accomplished through the compact arrangement of a generally vertically-nonmovable inner container for holding bird seed and rendering it available to hungry birds through a side opening therein, and an outer guard element biased to a normal position in which a side opening therein is aligned with the side opening in the container and movable to another position in which the side openings are not aligned under the weight of a squirrel thereon. The inner container is suspended from above by a stiff rod extending down through an opening in the top of the outer guard element and substantially into the inner container whereat it is attached as by a cross bar on the end of it to the walls of the inner container so that an elongated lever is provided preventing ready tilting of the feeder by a squirrel and loss of seed through the side openings. The bias may be provided by a tension spring extending from the bottom of the inner container to a bottom part of the outer guard element. The weight of a squirrel on the outer guard element causes it to sink with respect to the inner container to where the side openings are not longer aligned. A detent mechanism may be employed to help hold the outer guard element in normal position.

Removal of the squirrel's weight allows the spring to bring the outer back up to where its side opening is again aligned with the inner container side opening. A stud projecting sidewise from one of the inner and outer containers is slidably received in a slot in the other to guide the outer container back to where the side openings in them are aligned for feeding action by the birds.

Swinging action of the bird feed is limited not only by the long stiff rod, but also by a disk centrally fixed on the upper end of the stiff rod. Thus the periphery of the disk may strike a portion of the support to limit swinging action of the rod and hence of the bird feeder.

A novel seed distributor regulates the seed level at an access hole while allowing flow-through to accommodate several levels of access holes.

BRIEF DESCRIPTION OF DRAWINGS OF AN EMBODIMENT OF THE INVENTION

These and other objects, features and advantages of the invention will become apparent from a reading of the following description of a preferred embodiment of the invention, when considered with the appended drawings wherein:

FIG. 1 is a front elevational view of the preferred embodiment of the invention; and FIG. 2 is a view in perspective, partly broken away to show the interior, of the preferred embodiment.

DETAILED DESCRIPTION OF THE PREFERRED EMBODIMENT OF THE INVENTION

Figure 1:
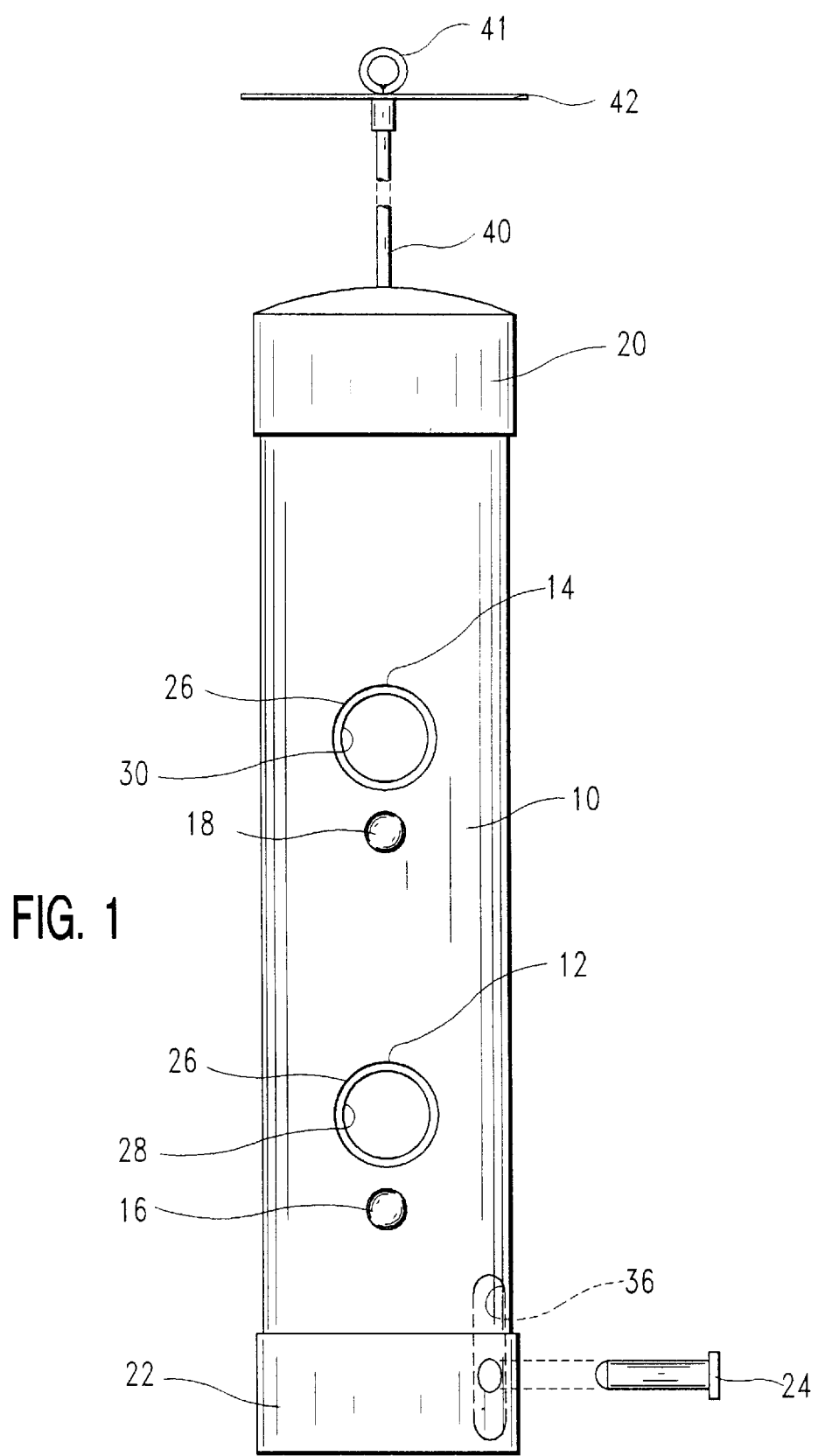

Referring now more particularly to the drawings, the squirrel-resistant bird feeder is shown as including an outer cylinder or guard element 10 having lower and upper seed access holes 12 and 14 (duplicated in the back) for birds, horizontally extending bird perches 16 and 18 for the respective access holes 12 and 14 in the front and back, a removably-secured upper end cap 20 closing off the top of the cylinder 10, and a lower end cap 22 secured to the cylinder and bearing a guide pin 24. The function of the guide pin 24 will be made apparent later.

The outer cylinder is made of steel mesh or a tough plastic such as hard-coated polycarbonate (know commercially as LEXAN) preclude destruction through chewing by squirrels.

Figure 2:
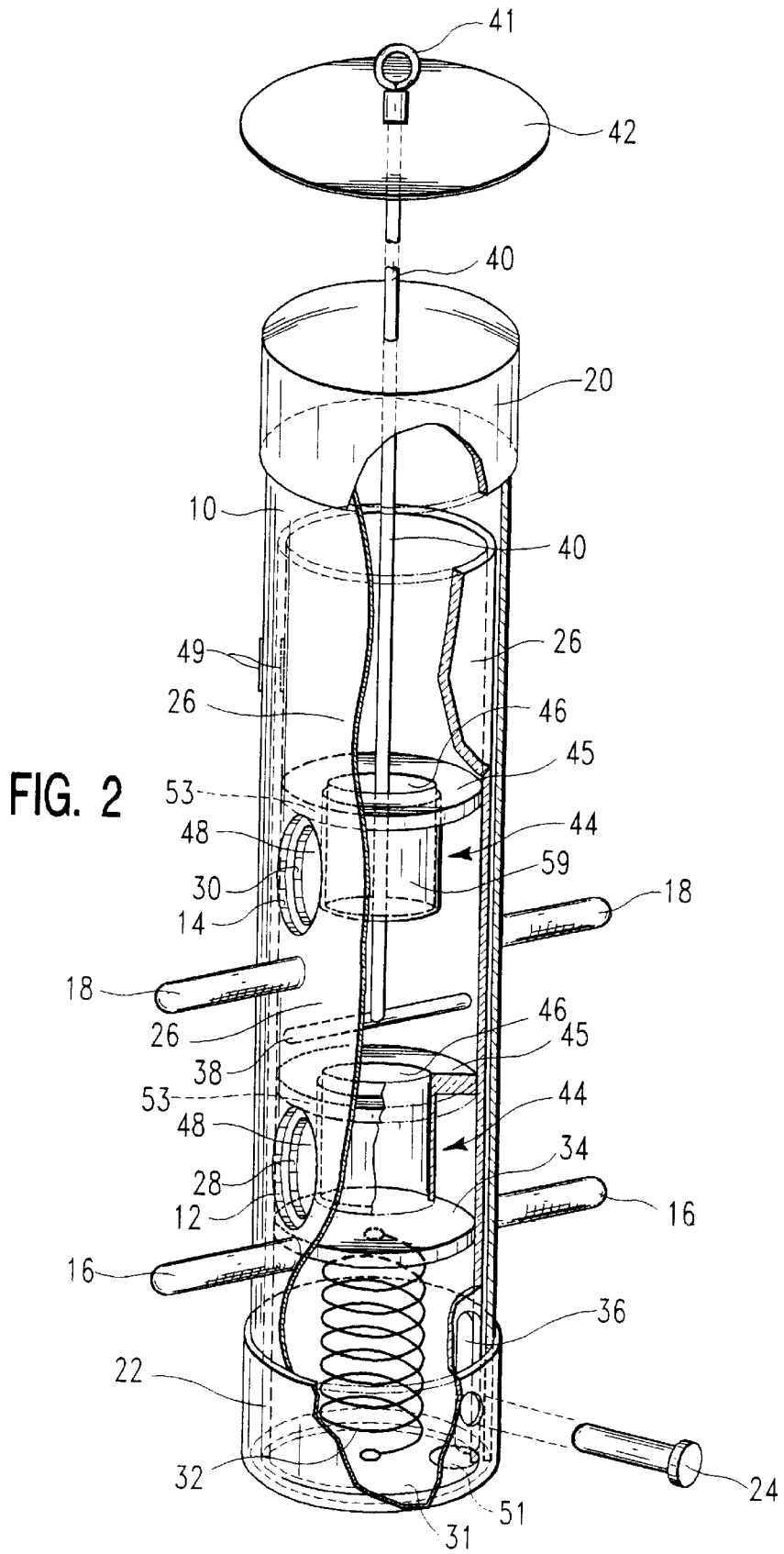

As best seen in FIG. 2, the outer cylinder 10 surrounds an inner cylinder or container 26 that holds the bird seed in the feeder. It is formed with lower and upper seed access holes 28 and 30 in front and back and which align with respective ones of the outer-cylinder access holes 12 and 14 in the normal condition of the bird feeder. The normal bird-feeding condition of the bird feeder is defined by the engagement of the bottom end of the inner cylinder 26 by the floor 31 or similar structure of the outer-cylinder lower end cap 22 under the bias of a tension spring 32. The tension spring 32 may be suitably anchored at its lower end to the floor of the lower end cap 22 via a central opening in it, and at its upper end to the inner cylinder 26 via a central opening in its floor 34.

The tension spring 32 is of sufficient strength to hold the outer cylinder 10 in the normal bird-feeding condition in which the outer-cylinder access holes 12 and 14 are in alignment with the inner cylinder access holes 28 and 30 and only small birds are on the perches 16 and 18. The tension spring 32 however is also sufficiently weak that if a squirrel rests somewhere on the outer cylinder 10, it will let the outer cylinder 10 move downwards with respect to the inner cylinder 26 to where the access holes in the outer and inner cylinders are no longer aligned and access to the bird seed is denied the squirrel. When the frustrated squirrel leaves the bird feeder, the tension spring 32 raises the outer cylinder 10 to the normal bird feeding condition determined by the engagement of the floor 31 of the lower cap 22 with the bottom of the inner cylinder 26 and wherein the access holes of the outer cylinder are aligned with respective ones of the inner cylinder 26. Detent means in the form of opposing magnets 49 are mounted on the inner surface of the outer guard element and the outer surface of the inner container to help hold the outer guard element in normal position.

The walls of the inner and outer cylinders 26 and 10 are spaced from each other about a quarter of an inch to make sure seed spillage does not jamb the relative movement of the two cylinders.

Continued alignment of the bird feeder outer and inner cylinder access holes in the normal bird feeding condition after repeated squirrel visits is assured via a vertical slot 36 cut in the lower end of the inner cylinder. The slot 36 receives the inner end of the guide pin 24 sturdily mounted through the wall of the outer cylinder 10 and its lower end cap 22. Thus the outer cylinder 10 is guided in its downward and upward movements due to squirrel action, and its access holes are always returned to alignment with the respective ones of the inner cylinder 26. The slot 36 need not be vertical; it may be diagonal.

The bird feeder is mounted in an appropriate bird feeding location via the inner cylinder 26. To this end, it may mount an internal cross bar 38 secured at its ends to the inner surface of the cylinder. The cross bar 38 at its midpoint is secured to the lower end of a somewhat stiff vertical rod 40. The upper end of the rod 40 extends through a hole in the outer cylinder upper end cap 20 for a considerable distance to where it terminates in an eyelet 41 facililtating mounting the feeder on a suitable support such as a tree limb. The vertical rod 40 is made somewhat stiff to prevent squirrels from pulling the feeder upwards and tilting it to spill its seeds, and somewhat stiff and long to provide a long lever arm discouraging squirrels from swinging the feeder to spill its seed. The rod 40 and end cap 20 also coact to guide relative movement of the upper end of the outer cylinder with respect to the inner one.

Swinging of the bird feeder may be rendered even more difficult by fixing a horizontal disk 42 to the upper end of the rod 40. The outer edge of the disk 42 is liable to strike a portion of the suitable support to limit the pivoting action of the somewhat stiff rod 40 and hence the swinging action of the bird feeder through the action of the outer cylinder upper end cap 20 and the cross bar 38.

For each horizontal set of access holes 28 and 30, the inner cylinder 26 suitably mounts a seed dispenser 44. The seed dispenser 44 is a generally hollow cylindrical object having a flat upper surface 45 with a central opening 46 to pass bird seed through the dispenser to fill up the inner-container space therebelow to where a hollow cylinder baffle 53 depending from around the central opening 46 to the level of the bottom edge of the associated access hole terminates, to fix the non-spilling level of the seed presentation to birds using the access hole. The inner container may continue to be filled above the dispenser. Thus seed can be accessed by birds through side holes 48 in the sidewalls of the dispenser aligned with corresponding access holes in the inner and outer cylinders. In the case of the lower dispenser, accumulation of seed is prevented by the floor 34 of the inner cylinder. Any seed spillage between cylinders exits the lower portion of the outer guard through the small hole 51.

In installation, the feeder would be secured to a support such as the limb of a tree by passing a wire over the limb and passing it through the eyelet 41 at the upper end of the support rod 40. The cap 20 may be removed from the outer cylinder 10 and bird seed poured into the inner cylinder 26. Bird seed would flow through the opening 46 in the upper end of the upper dispenser 44 and would run down through the baffle 53 TLB into the lower portion of the inner cylinder. Pouring would continue until the entire inner cylinder was full, the seed levels within the outer portions of the dispensers being fixed by the lower ends of the baffles 53. Then the cap 20 would be replaced. Small birds would now land on the perches 16 and 20 and help themselves to the seeds in the dispensers 44 by inserting their beaks through the corresponding access holes in the outer and inner cylinders and dispensers.

If during use a squirrel should get some place on the feeder as on perch 16 or 18 or the upper end cap 20, the weight of the squirrel will cause the outer cylinder 10 to slide downward, after breaking the detent, against the tension of the spring 32 to where its access holes 12 and 14 are non-aligned with the inner-cylinder access holes 28 and 30 and the squirrel is precluded from reaching into the feeder and helping to bird seed. The nondestructive nature of the outer cylinder further frustrates the squirrel, who leaves. Removal of his weight from the outer cylinder allows the tension spring 32 to restore the outer cylinder 10 to normal bird feeding condition in which its access holes are aligned with those of the inner cylinder 26 and the detents reset.

It will be evident then that there has been provided a squirrel-resistant bird feeder which should be commercially-successful in that it should successfully resist the attention of squirrels. Its bird seeds can not be had by squirrels in normal operation, and it is resistant to destruction by squirrels. Moreover it is reliable in operation and easy to fill. Furthermore it is inexpensive of and simple to manufacture (being fundamentally two relatively-movable cylinders, and using a slightly modified plastic cap as the seed dispenser), while attractive in appearance.

While there has been shown and described a preferred embodiment of the invention, it will be apparent to those skilled in the art that the principles of the invention may readily be incorporated in other and different embodiments. It is thus desired to be limited only by the scope or spirit of the appended claims.

What is claimed is:

1. A readily reloadable bird feeder resistant to squirrel marauding comprising
an inner container for holding bird seed and open at the top for receiving bird seed and having
a side opening for enabling bird access to the seed and
a structure comprising a rod engaging at its lower end the container for mounting the container on a support,
a relatively-movable guard element surrounding the container and having a removable cover at its upper end slidably engaging the rod and having
a side opening for alignment with the container's side opening to enable bird access through the aligned openings to the seed,
and a mechanism biasing the guard element to a position in which its side opening is aligned with the container side opening.

2. A bird feeder according to claim 1, wherein the inner container includes a cylinder open at the top.

3. A bird feeder according to claim 2, wherein the inner container has more than one side opening and the guard element has aligned side openings.

4. A bird feeder according to claim 3, wherein perches extend laterally from the guard element below its side openings for birds interested in feeding thereat.

5. A bird feeder according to claim 2, wherein the guard element includes a cylinder.

6. A bird feeder according to claim 5, wherein the bottom of the guard element cylinder is closed off by a end cap that has an opening for passing spilled seed.

7. A bird feeder according to claim 6, wherein the end cap has a floor.

8. A bird feeder according to claim 1, wherein a perch extends laterally from the guard element below its side opening for birds interested in feeding thereat.

9. A bird feeder according to claim 1, wherein the mechanism is a tension spring connected between the container and the guard element.

10. A bird feeder according to claim 1, and guide controlling the relatively movement of the guard element with respect to the inner container.

11. A bird feeder according to claim 10, wherein the guide is a pin on the guard element and inner container and a coacting slot on the other.

12. A bird feeder according to claim 11, wherein the slot extends vertically in the lower end of the inner container.

13. A bird feeder according to claim 1, wherein the inner container at the side opening includes a dispenser for limiting the flow of bird seed through the side opening.

14. A bird feeder according to claim 1, and a detent mechanism for holding the guard element in the aligned hole position.

15. A bird feeder resistant to squirrel marauding comprising
an inner container for holding bird seed and having
a side opening for enabling bird access to the seed and
a structure for mounting the container on a support,
a relatively-movable guard element surrounding the container and having
a side opening for alignment with the container's side opening to enable bird access through the aligned openings to the seed,
and a mechanism biasing the guard element to a position in which its side opening is aligned with the container side opening,
wherein the inner container includes a cylinder open at the top,
wherein the guard element includes a cylinder,
wherein the bottom of the guard element cylinder is closed off by an end cap that has an opening for passing spilled seed,
wherein the end cap has a floor,
wherein the mechanism is a tension spring connected between the container and the guard-element end-cap floor.

16. A bird feeder according to claim 10, wherein the top of the guard element cylinder is closed off by a end cap constituting the removable cover.

17. A bird feeder according to claim 16, wherein the end cap has a central hole, and the stiff rod constituting the structure for mounting the container on a support projects upward through the end cap hole for attachment to a support for the bird feeder.

18. A bird feeder according to claim 17, and a perpendicularly extending disk fixed to the upper end of the stiff rod to limit swinging action of the bird feeder.

19. A bird feeder resistant to squirrel marauding comprising
an inner container for holding bird seed and having
a side opening for enabling bird access to the seed and
a structure for mounting the container on a support,
a relatively-movable guard element surrounding the container and having
a side opening for alignment with the container's side opening to enable bird access through the aligned openings to the seed,
and a mechanism biasing the guard element to a position in which its side opening is aligned with the container side opening,
wherein the inner container at the side opening includes a dispenser for limiting the flow of bird seed through the side opening,
wherein the dispenser has a central upwardly facing opening from around which a hollow baffle depends to fix the level of seed within the dispenser and a side opening for providing access to the seed therein.

20. A bird feeder according to claim 19, wherein the dispenser passes seed down to a lower portion of the inner container to a lower dispenser.

21. A bird feeder resistant to squirrel marauding comprising an inner container for holding bird seed and having a side opening for enabling bird access to the seed and a structure for mounting the container on a support, a relatively-movable guard element surrounding the container and having
a side opening for alignment with the container's side opening to enable bird access through the aligned openings to the seed, a mechanism biasing the guard element to a position in which its side opening is aligned with the container side opening, wherein the inner container includes a cylinder open at the top, wherein the inner container includes a level-controlling and passing seed dispenser at each access opening, wherein a perch extends laterally from the guard element below its side opening for birds interested in feeding thereat, a guide controlling the relatively movement of the guard element with respect to the inner container, wherein the guard element includes a cylinder, wherein the bottom of the guard element cylinder is closed off by a bottom end cap having a small hole to pass spillage, wherein the mechanism is a tension spring connected between the container and the guard-element bottom end-cap floor, wherein the top of the guard element cylinder is closed off by a top end cap, wherein magnets detent the guard element in the opening alignment position, wherein the top end cap has a hole, and the structure for mounting the container on a support includes a stiff rod fixed at its lower end to the inside of the cylinder and projecting upward through the top end-cap hole for attachment to a support for the bird feeder, and a perpendicularly extending disk fixed to the upper end of the stiff rod to limit swinging action of the bird feeder, wherein the inner container at the side opening includes a dispenser for limiting the flow of bird seed through the side opening.

22. A bird feeder resistant to squirrel marauding comprising an inner container for holding bird seed and having
a side opening for enabling bird access to the seed and
a structure for mounting the container on a support, a relatively-movable guard element surrounding the container and having
a side opening for alignment with the container's side opening to enable bird access through the aligned openings to the seed, and a mechanism biasing the guard element to a position in which its side opening is aligned with the container side opening, and a detent mechanism for holding the guard element in the aligned hole position, wherein the detent mechanism includes a magnet on one of the inner container and the guard element.

* * * * *